Sept. 7, 1943. R. M. LEIPPE 2,329,123
WATTHOUR METER
Filed Jan. 26, 1940
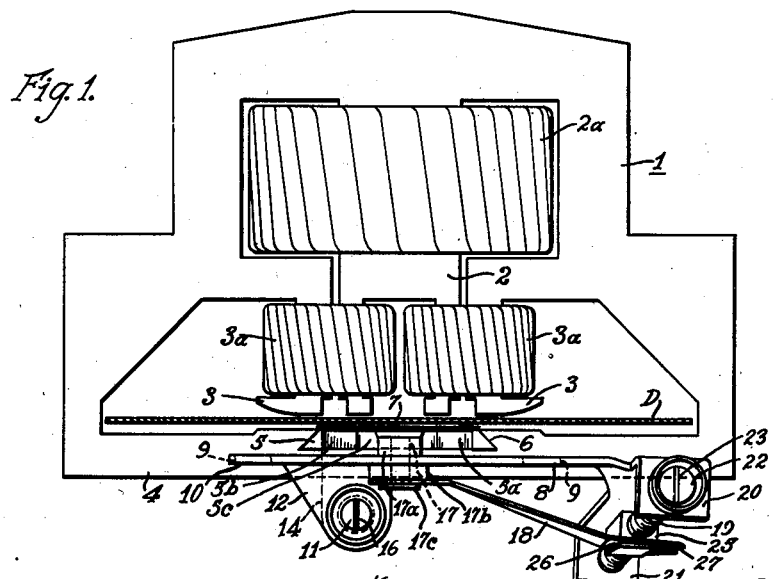
Fig. 1.
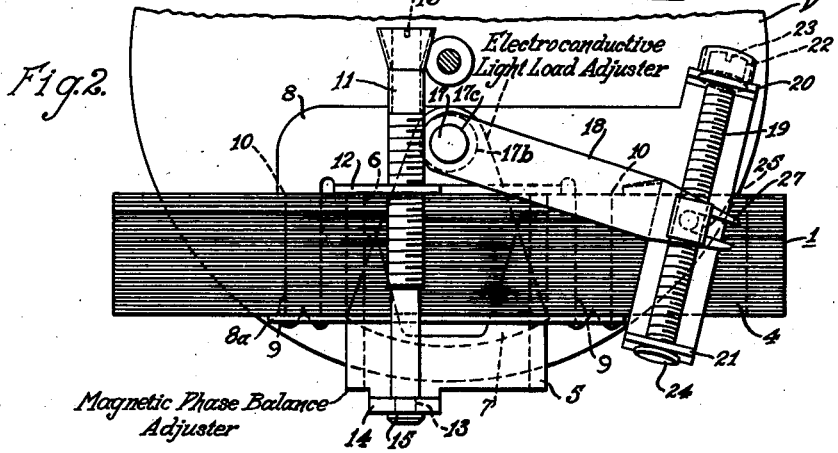
Fig. 2.
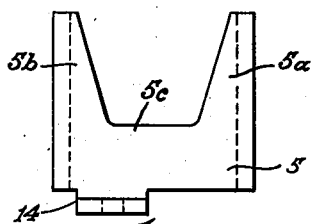
Fig. 3.
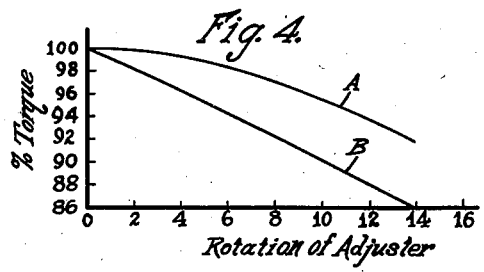
Fig. 4.
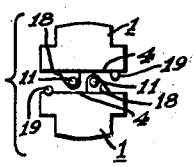
Fig. 5.
WITNESSES:
E. F. Olerheim
C. L. Freedman
INVENTOR
Richard M. Leippe.
BY 
ATTORNEY

Patented Sept. 7, 1943

2,329,123

UNITED STATES PATENT OFFICE 2,329,123

WATT-HOUR METER

Richard M. Leippe, East Orange, N. J., assignor to Westinghouse Electric & Manufacturing Company, East Pittsburgh, Pa., a corporation of Pennsylvania Application January 26, 1940, Serial No. 315,694

3 Claims. (Cl. 171—264)

This invention relates to electrical instruments and it has particular relation to electrical measuring instruments of the watthour meter type.

In the copending application of Walter G. Mylius, Serial No. 226,621, filed August 25, 1938, which has since matured into U. S. Patent No. 2,240,666, granted May 6, 1941, an improved adjustment unit particularly suited for polyphase watthour meters is disclosed. Although this unit has proven to be a desirable advance over the prior art, I have found it possible to effect still further improvements therein.

Said Mylius application discloses a phase balance or torque adjustment and a light load adjustment. The phase balance or torque adjustment is effected by a substantially rectangular magnetic plate which is moved relative to the magnetic core of an electromagnet with which it is associated. The light-load adjustment is effected by an electroconductive segment which is rotated across a face of the magnetic plate.

In accordance with this invention, the range of adjustment of a watthour meter for phase balance or torque is increased substantially by modifying the form of the phase balance plate. Instead of a rectangular magnetic plate, a substantially U-shaped magnetic plate is employed. The configuration of the magnetic plate is so selected that magnetic material is introduced into a magnetic core, or removed therefrom, at such a rate that a substantially linear adjustment is obtained. Moreover, the phase-balance magnetic plate is adjusted by a device or screw so constructed that the position of the magnetic plate is readily apparent by an inspection of the adjustment device. When adjustment screws are to be mounted externally of a meter core, preferably they are mounted dissymmetrically in order to provide adequate clearance for the screws when two cores are closely associated in a polyphase meter.

It is, therefore, an object of my invention to provide a phase or torque balance adjustment for a measuring instrument which has a substantially extended range of adjustment.

It is a further object of my invention to provide an adjustment unit for an electrical measuring instrument which makes efficient use of the space available in the measuring instrument.

It is a further object of my invention to provide an adjustment device for a measuring instrument which includes a visible position indicator for the device.

It is a still further object of my invention to provide a simple and efficient construction for an adjustment unit of an electrical measuring instrument.

Further objects of my invention will be apparent from the following description, taken in conjunction with the accompanying drawing, in which:

Figure 1 is a view in front elevation of a watthour meter electromagnet embodying my invention;

Fig. 2 is a view in bottom plan of the electromagnet illustrated in Fig. 1;

Fig. 3 is a detail view in bottom plan of a phase or torque balance element embodying my invention;

Fig. 4 is a graphical view showing ranges of adjustment of torque or phase balance plates; and Fig. 5 is an outline view in front elevation of a polyphase meter assembly embodying my invention.

Referring to the drawing, Fig. 1 shows a magnetic meter core 1, which may be of the type having a potential pole 2 and current poles 3, all located above a magnetic flux return member or keeper 4. For further details of this well known core, reference may be made to Patents Nos. 1,691,354 and 1,702,450. Magnetic cores of this type have been employed widely for watthour meters.

In order to adjust polyphase meters employing such cores for phase balance, I mount a magnetic element or plate 5 of material, such as soft iron, for reciprocation in a recess 6 provided in the keeper 4. This magnetic element may be retained more securely if the coacting edges of the recesses 6 and the plate are beveled to provide an overhanging or dovetailed relationship. A construction of the type thus far described is illustrated in the aforesaid Patent 1,702,450.

If a magnetic element 5 of substantially rectangular form is employed, a linear adjustment for phase or torque balance is not obtained. This is for the reason that a movement of the magnetic element results in uniform withdrawal of magnetic material from the magnetic core with which the element is associated. For initial stages of movement, the change in torque for a given movement is much smaller than for subsequent stages of movement of the magnetic member. The performance of such a magnetic element is shown more clearly in Fig. 4, wherein ordinates represent percentage of normal, full-load torque developed by a watthour meter unit, and abscissae represent movements of the magnetic element away from its maximum torque position, or turns of an adjusting screw employed for moving the element. In Fig. 4, the curve A illustrates the performance of a magnetic element having a rectangular outline. It will be noted that the curve A is not linear in shape and that the range of adjustment is somewhat restricted for a given rotation of the adjusting screw.

By modifying the shape of the magnetic element 5, the range and linearity of adjustment may be materially improved. Although the shape may vary appreciably, I have illustrated a preferred embodiment in Fig. 3, wherein the magnetic element 5 is made up of two arms 5a and 5b which are united over a portion only of their lengths by a bridging part 5c. The elongated arms guide the element in the recess throughout the entire movement thereof. The configuration is such that for initial withdrawal of the magnetic element 5, a greater proportion of magnetic material is removed from the magnetic core 1 than for subsequent withdrawal of the magnetic element. By proper selection of the configuration as illustrated in Fig. 3, a substantially linear phase or toque balance adjustment is provided. Such an adjustment is represented by the curve B in Fig. 4.

In Fig. 4, it will be noted that for a given actuation of the adjusting screw, such as 14 turns thereof, the torque developed by a watthour meter provided with a magnetic element similar to that shown in Fig. 3 drops from 100% to 86% normal torque. Moreover, this drop is substantially linear. By way of contrast, a magnetic core provided with a substantially rectangular magnetic element would have a torque variation from 100% to 92% for the same rotation of the adjusting screw. The linearity of adjustment and the extended range of adjustment both are of great value in watthour meters.

Errors in light-load performance of a meter may be corrected by means of a segment 7 of an electroconductive material, such as brass, which may be rotated across the face of the potential pole 2 for shading a portion of the pole face. It should be noted that the segment 7 overlies the magnetic element 5. A rotatable electroconductive armature or disk D is positioned between the segment 7 and the poles 2, 3.

It will be noted that the potential pole 2 is surrounded by a potential winding 2a and the current poles 3 are surrounded by current windings 3a. When these windings are energized in accordance with the potential and current of an alternating current circuit, a shifting magnetic field is produced in the gap between the poles and the keeper 4. As well understood in the art, this shifting magnetic field operates to rotate the disk D which may be mechanically connected by gearing to a suitable register (not shown) for integrating watthours or any other suitable quantity. Rotation of the segment 7 across the potential pole 2 changes the extent of its shading action and, consequently, varies the light-load torque applied to the disk D.

Both the element 5 and the segment 7 are mounted on a single supporting member 8 having a pair of projecting slotted arms 9. The supporting member may be affixed to the core 1 by inserting the arms 9 through openings 10 provided in the keeper 4 until the slotted portions of the arms 9 emerge on the opposite side of the keeper. The supporting member may be held in this position in any suitable way as by deforming the slotted ends of the arm 9. If desired, a protective plate 8a may be interposed between the upset or deformed ends of the arms 9 and the keeper 4.

For adjusting the magnetic element 5, an adjusting screw 11 is provided which is adjustably mounted in a flange 12 carried by the supporting member 8. The flange 12 is provided with a threaded opening for engaging the threads of the adjusting screw 11. Consequently, rotation of the adjusting screw 11 moves the screw axially relative to the flange 12.

At one end, the adjusting screw 11 is provided with a reduced portion 13, which passes freely through an opening provided in a flange 14 carried by the magnetic element 5. The exposed end 15 of the adjusting screw 11 may be upset to prevent axial movement of the adjusting screw relative to the magnetic element 5. A screw-driver slot 16 may be provided in the head of the adjusting screw 11 for facilitating rotation thereof.

With the parts related as described, when the adjusting screw 11 is rotated, the adjusting screw moves axially relative to the flange 12 and carries the magnetic element 5 towards or away from the magnetic core 1. Since the screw 11 and the magnetic element 5 move together, the distance from the head of the screw to the flange 12 is a measure of the position of the magnetic element 5.

The electroconductive segment 7 for light-load adjustments is carried by a stud shaft 17 which is rotatably mounted on the supporting member 8. Consequently, by rotating the stub shaft 17, the segment 7 may be positioned as desired to control the light-load characteristics of the meter. To this end, a flat, flexible and resilient arm 18 is attached to a portion of the stub shaft 7 which projects from the supporting member 8. As illustrated, the stub shaft 17 extends through spacing washers 17a and 17b and is attached to the arm 18 in any suitable manner as by upsetting the end 17c thereof or by soldering the arm thereto.

The position of the arm 18 is determined by an adjusting screw 19 which is carried by two flanges 20 and 21 formed on the supporting member 8. This screw 19 is provided with an enlarged head 22, having a screw-driver slot 23, and with an upset end 24 for preventing axial movement of the screw relative to the supporting member 8. The screw 19 extends freely through openings provided in the flanges 20 and 21 so that the screw can be rotated as desired.

For engaging the arm 18, the adjusting screw 19 carries a threaded carriage block 25 which is provided with an annular groove 26. The free end of the arm 18 is slotted to form a fork 27 which is received in the annular groove 26. The fork 27 is of such length that movement of the carriage block 25 along the screw does not withdraw the carriage block from engagement with the fork.

It will be noted that the screw 19, the carriage block 25 and the arm 18 are twisted about an axis extending between the carriage block 25 and the stub shaft 17 when the parts are in the position illustrated in Fig. 2. This twisting may be for providing desired clearance between the light-load adjusting mechanism and other portions of the meter assembly. In addition, the twisting of the arm 18 is employed for providing a locking action for the carriage block.

When the arm 18 is in its original free position, it offers a flat surface which is substantially parallel to the lower edge of the core 1. When the arm 18 is twisted as illustrated in Fig. 1, the resilience of the arm tends to urge or bias the arm and the carriage block with which it is associated to their original positions. Because of this biasing action, the arm 18 maintains a firm engagement between the carriage block 25 and the adjusting screw 19. Not only does this action tend to eliminate lost motion, but it tends to retain the carriage block in any position to which it is adjusted.

It is believed that the operation of the parts thus far described is apparent. As above explained, rotation of the adjusting screw 11 adjusts the magnetic element 5 to correct the phase or torque balance of the meter. In a similar manner, rotation of the adjusting screw 19 operates through the adjusting arm 18 and the stub shaft 17 attached thereto to rotate the electroconductive segment 7, and consequently adjusts the meter for light load.

It will be noted that the adjusting screw 11 and 19 both extend across an external edge of the core 1. This extension provides an extended range of adjustment and at the same time makes most efficient use of the space available in the meter assembly.

My invention is particularly adapted for polyphase watthour meters of the compact type disclosed in the Bradshaw Patent 2,081,981. Such a polyphase watthour meter is illustrated in outline in Fig. 5. It will be noted that in this construction, one of the cores 1 is inverted to bring the keepers 4 of the two cores adjacent each other. Since each of the adjusting screws 11 is displaced from the vertical center line of the meter, the two adjusting screws 11 and 19 for the polyphase meter are brought into side-by-side relationship. This association of parts is made possible by the clearance present under the arm 18. If the two adjusting screws 11 and 19 were symmetrical relative to the center line of the meter cores 1 when the meter cores are associated as in Fig. 5, the adjusting screws on one core would be directly beneath the adjusting screws on the other core. This would seriously reduce the vertical space available for each of the adjusting screws. By separating the screws, as illustrated in Fig. 1, and by providing the necessary clearance beneath the arm 18, applicant is able to place all four of the screws in Fig. 5 in the restricted space available between the two cores without unduly restricting the sizes of the various parts.

The side-by-side relationship of the screws 11 in Fig. 5 is desirable from another viewpoint. As above explained, the distance of the head of each screw 11 to its flange 12 is an indication of the position of the magnetic element 5. When the screws 11 are in the position illustrated in Fig. 5, a mere inspection of the screws indicates the relative positions of the two magnetic members 5 associated therewith.

The various parts employed for attaching the member 5 and the segment 7 to the meter core, and for adjusting the member and segment, may be constructed of any suitable material, such as bronze or brass.

Although I have described my invention with reference to certain specific embodiments thereof, I do not desire my invention to be restricted except as required by the appended claims.

I claim as my invention:

1. In an electrical watthour meter, a magnetic core having a pole portion, an armature member mounted for movement in accordance with torque produced by magnetic flux passing through said pole portion, and torque balance means for modifying the torque applied to said armature member comprising a magnetic element movable for altering the reluctance of said magnetic core to make torque balance adjustments for said watthour meter, and adjusting means for moving said magnetic element, said magnetic element having a configuration such that equal actuations of said adjusting means produce substantially equal alterations in said torque over the entire operating range of said adjusting means.

2. In an electrical measuring instrument, a first electromagnet assembly including a magnetic core having an air gap bordered by current and potential pole pieces, current and potential windings associated with said pole pieces for producing, when energized, a shifting magnetic field in said air gap, an electroconductive armature mounted for rotation in said air gap under the influence of said magnetic field, and adjusting means for said electromagnet assembly including an adjustable phase balance magnetic element and a first adjusting screw member for adjusting said magnetic element, said screw member being positioned externally of said magnetic core and extending across a first peripheral surface of said magnetic core in a direction substantially transverse to the plane of the core; a second electromagnet assembly substantially similar to said first electromagnet assembly but inverted relative thereto with the first peripheral surface of said electromagnets adjacent each other to define a space therebetween, the first adjusting members of said electromagnets being disposed substantially in side-by-side relationship in said space; and a second adjusting means for each of said electromagnets having a second adjusting screw member positioned in said space, the second adjusting member on said first electromagnet having a flat pivotally mounted operating arm extending between the first peripheral surface of said first electromagnet and the first adjusting member of the second electromagnet, and means in threaded engagement with said second adjusting screw member for converting movement of said last-named means axially of the associated screw member into pivotal adjusting movement of the associated operating arm.

3. In an electrical watthour meter, an electromagnet assembly including a magnetic core having an air gap bordered by current and potential pole pieces, and energizable means cooperating with said current and potential pole pieces for producing, when energized, a shifting magnetic field in said air gap, an electroconductive armature mounted for rotation in said air gap under the influence of said magnetic field, and adjusting means for said electromagnetic assembly including a supporting structure associated with said electromagnet, a pair of adjusting screws mounted for rotation in said supporting structure, said adjusting screws being positioned external to said magnetic core and extending across a peripheral surface of said magnetic core in a direction substantially transverse to the plane of said magnetic core, a phase balance magnetic element reciprocable in said air gap, means responsive to rotation of a first one of said adjusting screws for reciprocating said phase balance magnetic element, said phase balance magnetic element having a cross-section transverse to the direction of reciprocation which varies in value at different points along said direction of reciprocation to provide a substantially linear phase balance adjustment relative to rotation of said first one of said adjusting screws, a light load adjusting element positioned in said air gap, and means responsive to rotation of a second one of said adjusting screws for rotating said light load adjusting element.

RICHARD M. LEIPPE.